June 28, 1966  W. MELVILLE ETAL  3,257,906
EDGE TRIMMING MACHINE

Filed June 29, 1964  5 Sheets-Sheet 1

INVENTORS
WILLIAM MELVILLE
EDWIN WOOD
BY Cushman, Darby & Cushman
ATTORNEYS

United States Patent Office 3,257,906
Patented June 28, 1966

3,257,906
EDGE TRIMMING MACHINE
William Melville and Edwin Wood, Handsworth, Birmingham, England, assignors to Imperial Metal (Industries) Limited, London, England, a corporation of Great Britain
Filed June 29, 1964, Ser. No. 378,799
Claims priority, application Great Britain, July 2, 1963, 26,171/63
18 Claims. (Cl. 90—13)

This invention relates to edge trimming machines and in particular to milling machines for simultaneously trimming both edges of metal strips.

It is often necessary to condition the edges of strip during rolling in order to avoid the formation and propagation of edge cracks and conditioning is commonly achieved by trimming marginal portions by rotary shearing, which process is limited in that it cannot be used with thick strip and tends to be expensive in the amount of metal removed and hence scrapped. Hot rolled metal strip, e.g., of brass or copper, is sometimes curved from end to end in the plane of the strip and the edges to be trimmed are in consequence curved. Since the strip is moved during edge conditioning in a straight line, the edges after shearing or cutting are no longer parallel to the center line of the strip over its whole length.

According to the present invention an edge trimming machine comprises a pair of driven rotary cutters mounted for cutting opposite edges of metal strip and movable transversely with respect to the strip, sensing means cooperable with the edges of the strip on the ingoing side of the machine and coupled for transverse movement with the cutters and a guiding mechanism responsive to operation of the sensing means to effect transverse movement of the cutters. The machine is particularly suitable for trimming the edges of metal strip parallel to the center-line of the strip over its whole length.

Preferably the cutters are milling cutters on separately driven vertical spindles mounted on a cross slide permitting simultaneous transverse movement of the cutters. It is desirable that the mounting includes means for adjusting the distance apart of the cutters and this may be conveniently effected by means of two auxiliary slides carried on the cross slide adjustable by means of a right- and left-hand threaded shaft, the motors driving the spindles being secured to the auxiliary slides.

The auxiliary slides are quickly releasable from the adjusting means to permit rapid widening of the gap between the cutters so that the cutters can be quickly disengaged from the strip. This is achieved by abutting the auxiliary slides against nut members engaging the threads of the right- and left-hand threaded shaft by means of pressure exerted preferably by double-acting hydraulic cylinders carried on the cross slide. In normal operation, hydraulic pressure is maintained on both faces of the piston to hold each auxiliary slide against its nut member and when it is desired to disengage the cutters pressure on the outer face is reduced sufficiently for the piston to move the auxiliary slide away from the nut member. Adjustment of the gap between the cutters is carried out by manually turning the screwed shaft. The sensing means preferably comprises a pair of pivoted feeler arms, adjustable for various strip widths, bearing at the ends freely rotatable guide rollers which are pressed against the edges of the strip by springs acting on the feeler arms, and means for transmitting movements of the arms to a valve controlling a hydraulic cylinder which when energized imparts transverse movement to the cross slide.

In one manner of transmitting movements of the feeler arms, the arms are respectively connected through gearing and shafts to the spool and to the body of a hydraulic valve so that the spool or the body or both together can be relatively rotated and so control supply of hydraulic pressure to a cylinder.

The guide rollers follow the edges of the strip as it moves towards the cutters and as long as the feeler arms remain symmetrically disposed about the center-line of the strip, no transverse movement of the cutters occurs. Displacement of one arm only or movement of both arms in the same direction occurs when the center-line of the strip shifts and transverse movement of the cutters in response to the valve movement corrects the position of the cutters relative to the center-line. Since the guide rollers are mounted on a carriage which follows the movement of the cutters, such movement terminates when the symmetry of the arms is restored.

Preferably, the sensing means is so mounted that it may be moved longitudinally with respect to the strip in order that the guide rollers may engage the strip at such a point in advance of the cutters that premature and accurate movements of the cutters in relation to the strip are ensured. Conveniently, the carriage on which the sensing means is mounted is connected for longitudinal movement to a hydraulic cylinder, the operation of which is controlled by valves actuated by means, preferably cams, responsive to movements of the feeler arms. The valves, of which there are two, are so arranged to operate that when both are open or both are closed, the cylinder will move the carriage forwards or backwards.

Operation of one valve only produces no movement of the carriage. The cams, or other means for actuating the valves are so adjusted relative to movements of the feeler arms that the valves are actuated only when the guide rollers are separated by a distance which is a little less than the width of the untrimmed strip. When a strip is fed through the machine, the leading edge, which is normally tapered or rounded, engages the guide rollers and opens the feeler arms until the valves are actuated and the hydraulic cylinder advances the carriage at the same speed as the strip towards the cutters until the predetermined position of the guide rollers is reached. In the event of the guide rollers over-running the strip, the feeler arms would close in and the movement of the carriage would cease until the forward movement of the strip re-opened the feeler arms. When the end of the strip passes through the arms, the carriage is drawn back from the cutters.

As failure of the sensing means would allow the depth of cut to become excessive on one side or other of the strip and possibly cause damage to the machine, the machine is preferably provided with a safety device operable to withdraw the cutters clear of the strip and to disconnect them from the guiding mechanism and stop the machine and strip-feeding mechanism.

In a convenient manner of carrying this feature into effect, a pair of vertical rods are disposed one on each side of the strip a short distance in advance of the cutters and at an appropriate distance from the line of cut. A small displacement of either of the rods operates a servo-mechanism which actuates the hydraulic cylinders holding the auxiliary slides against their nut members on the right- and left-hand screwed shaft to move the cutters rapidly away from the strip. At the same time an electrical relay may be operated to stop the machines feeding the strip.

One embodiment of an edge trimming machine in accordance with the invention and alternative embodiments of the safety device will now be described with reference to the accompanying drawings of which:

Figure 1:
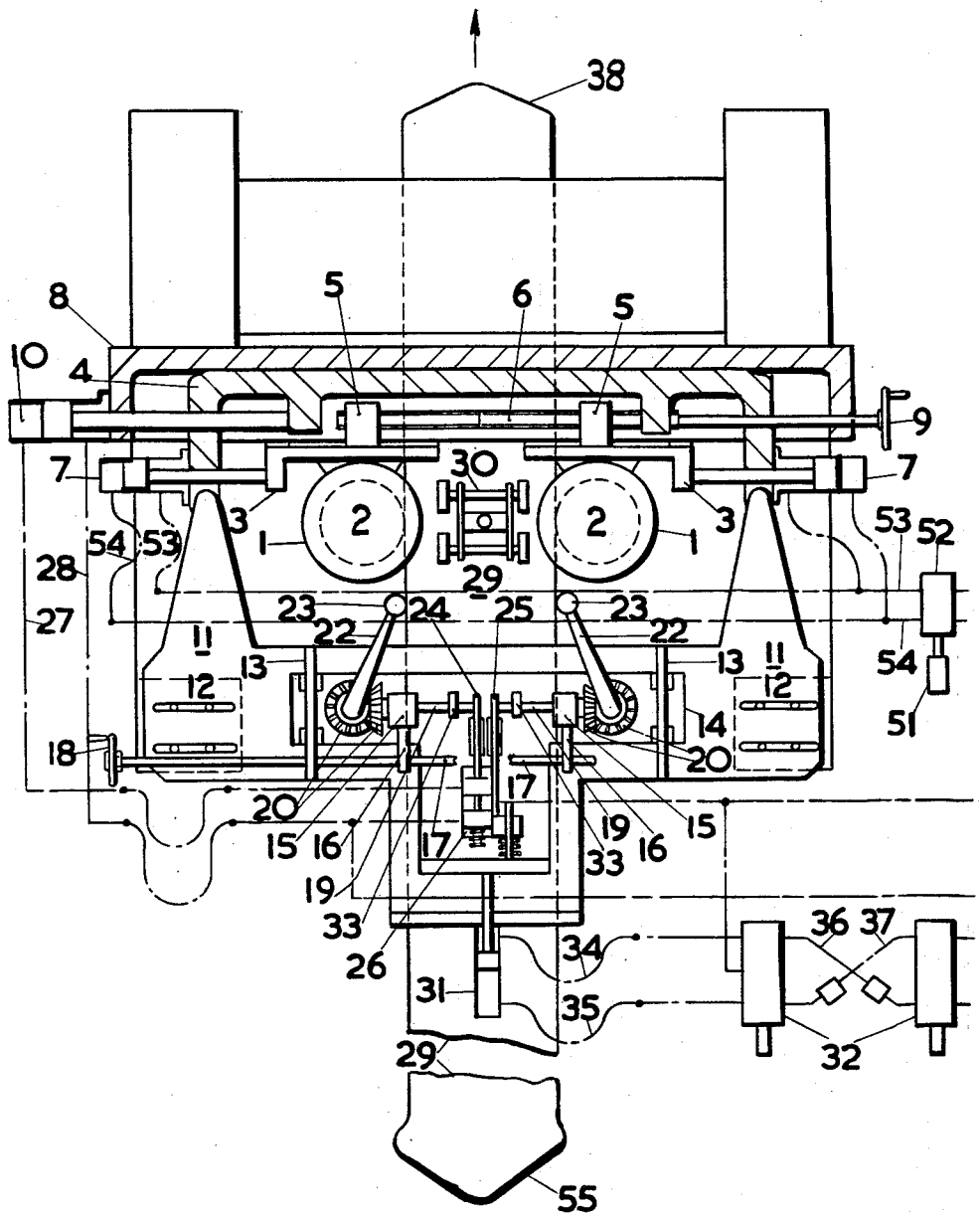
FIGURE 1 is a plan view, partly in cross-section of the edge milling machine.
Figure 2:
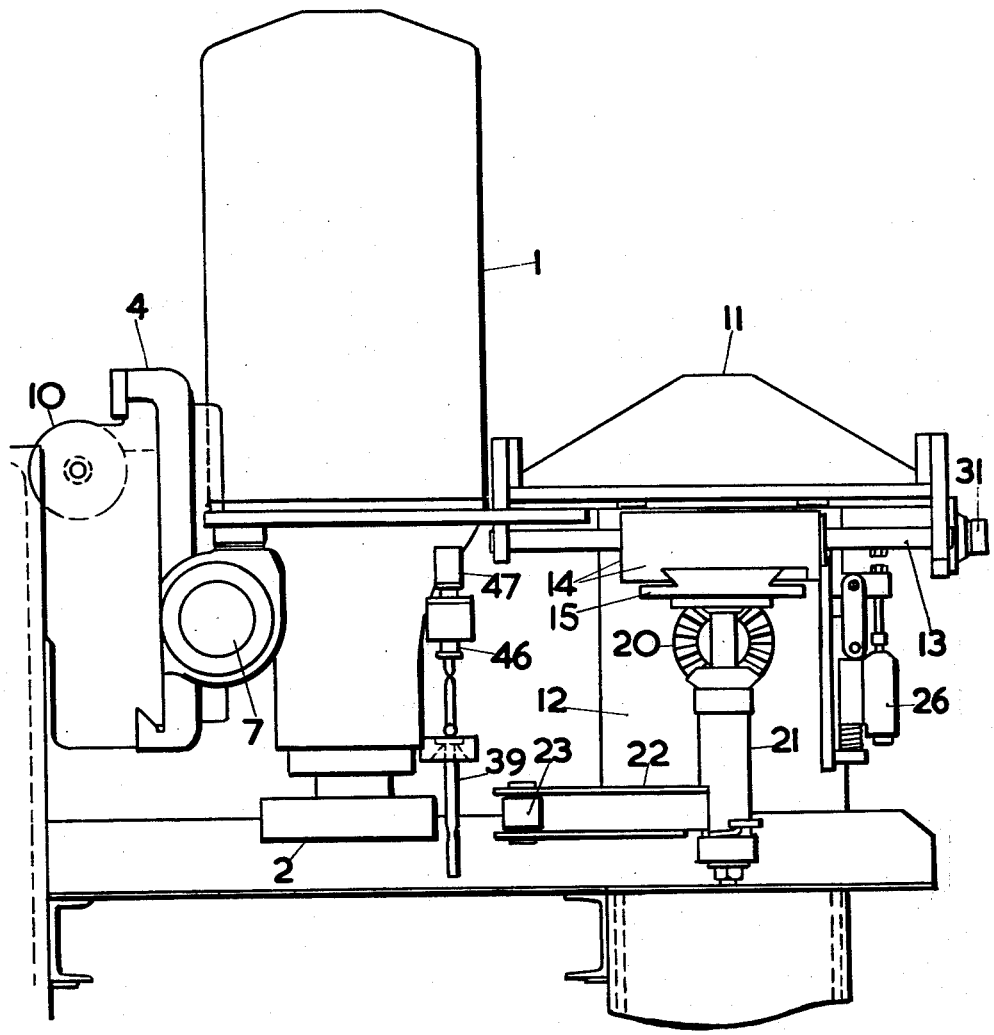
FIGURE 2 is a side elevation of the machine.

Referring to the drawings, a pair of milling cutter heads 1 driving milling cutters 2 are mounted on supports or auxiliary slides 3 which are carried on a saddle 4 slidable on a main slide 8 which is fixed. The auxiliary slides 3, and hence the cutters 2, are held at the required distance apart by abutment with the nut members 5 which engage the right-hand and left-hand threaded shaft 6, abutment being ensured during normal working by the pressure of a pair of hydraulic cylinders 7 mounted on the ends of the saddle 4. Rotation of the shaft 6 by means of handwheel 9 moves the nut members 5, and with them the cutter heads 1, towards or away from each other, thus determining the distance between the cutters 2. The saddle 4 is movable transversely by operation of a hydraulic cylinder 10 mounted on one end of the main slide 8, and the positions of the cutters 2 can thereby be varied relative to the center-line of the machine whilst remaining a fixed distance apart.

On the ingoing side of the machine, a crosshead 11 carried on supports 12 is secured to and is movable with the saddle 4. Mounted on the lower side of the crosshead 11 are slide rails 13 on which a slide 14 is movable longitudinally relative to the machine. On the underside of the slide 14 are carried mountings 15, slidable transversely for adjustment which is effected by means of threaded arms 16 carried by the mountings 15 engaging the right- and left-hand threaded shaft 17 rotatable by the handwheel 18.

Journalled in the mountings 15 are horizontal shafts 19 coupled through bevel gears 20 to the spring-loaded shafts 21 which carry feeler arms 22. Freely rotatable guide rollers 23 are mounted at the ends of the feeler arms 22 which are urged towards each other by the spring-loading of vertical shaft 21. Movement of the feeler arms 22 is transmitted through the vertical shaft 21, bevel gears 20, and horizontal shafts 19 to levers 24 and 25. The left-hand lever 24 is connected to the spool of valve 26 and the right-hand lever 25 is connected to the body of valve 26. The valve body and spool move against springs to take up any backlash in the mechanism.

Movement of the feeler arms 22 an equal amount inwards or outwards produces movement of the levers 24 and 25 such that the spool and body of the valve 26 move together and the valve setting remains unaltered. If one or other of the feeler arms 22 moves or if both move in the same direction, relative movement of the spool and body is produced and the valve setting is altered.

Valve 26 controls the supply of hydraulic fluid to the hydraulic cylinder 10 along one or other of the flexibly connected pipes 27 and 28, according to the relative positions of spool and body. Fluid pressure transmitted through pipe 27 moves the saddle 4 to the right and fluid pressure through pipe 28 moves the saddle to the left, thus moving the cutters 2 transversely. The position of the cutters 2 is therefore governed by the relative positions of the feeler arms 22.

In operation, the guide rollers 23 are held in contact with the edges of the strip 29 as it is moved in the direction of the arrow through the machine to be trimmed by the cutters 2, spring-loaded rollers 30 bearing on the surface of the strip to damp vibration. As long as the center-line of the strip coincides with the center of the line joining the cutters, the relative position of feeler arms 22 remains unchanged, but should the strip center-line deviate, the edges of the strip move both the feeler arms in one direction with the result that relative movement between the spool and body of valve 26 is produced and the hydraulic cylinder 10 is energized to move saddle 4 and cross-head 11 which is secured to saddle 4. Movement of the cross-head, which supports the feeler arms 22 and their associated mechanism, ceases when the feeler arms are restored to a symmetrical position, the centerline of the strip then coinciding with the central point between the cutters.

Carried on the cross-head 11 is a hydraulic cylinder 31 which is connected to the slide 14 to move it and the mechanism mounted on it in a longitudinal direction along the slide rails 13. The operation of hydraulic cylinders 31 is controlled by valves 32 which are operated by cams 33 carried on the horizontal shafts 19. The cams 33 are so adjusted on their shafts relative to the feeler arms 22 that the valves are opened only when the guide rollers 23 are separated by a distance a little less than the width of the untrimmed strip. The valves 32, which in FIGURE 1 are shown as separated from the cams 33 in the interests of clarity, are connected through pipes 34 and 35 to admit hydraulic fluid to the front and the rear end portions respectively of the cylinder 31 and are interconnected by pipes 36 and 37 in such a manner that fluid is admitted to the rear portion of the cylinder when both valves are open and to the front portion when one or both valves are closed. Operation of one valve only does not permit flow of fluid to the cylinder 31. Operation of the cylinder 31 produces movement of the slide 14 and hence of the feeler arms 22 towards or away from the cutters 2.

When the leading edge 38 of the strip 29 engages the guide rollers 23, the feeler arms 22 are moved apart and simultaneously rotate the cams 33 to open valves 32 when the guide rollers are separated by a distance a little less than the width of the strip. At the same time the feeler arms 22 operate the valve 26 and energize the cylinder 10 to align the cutters 2 with the strip ready for trimming. Opening valves 32 energizes cylinder 31 to move the slide 14 towards the cutters 2 at the same speed as the strip until the guide rollers 23 reach their working position close to the cutters. In the event of the slide 14 being propelled forward at a greater speed than the strip, the guide rollers 23 would close in along the leading edge 38, thereby closing one or both of valves 32. This stops the supply of fluid to cylinder 31 and arrests the motion of the slide 14 until the guide rollers are restored to the position at which the valves 32 open. When the tapered trailing edge 55 of the strip passes through the guide rollers 23, the supply of fluid to the cylinder 31 is redirected to move the slide 14 back.

Figure 3A:
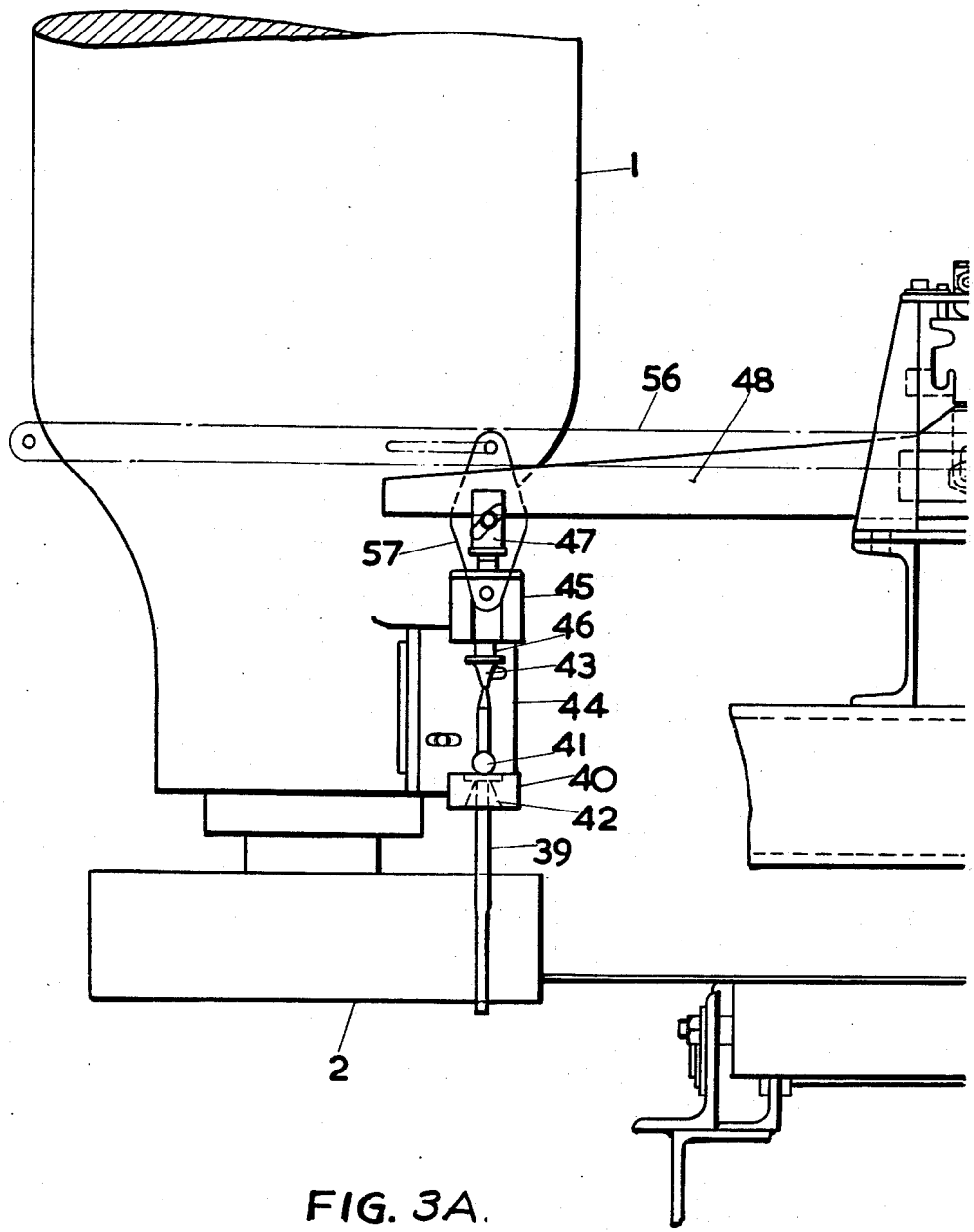
FIGURES 3A and 3B are the right and left halves of an elevation of the first embodiment.
Figure 3B:
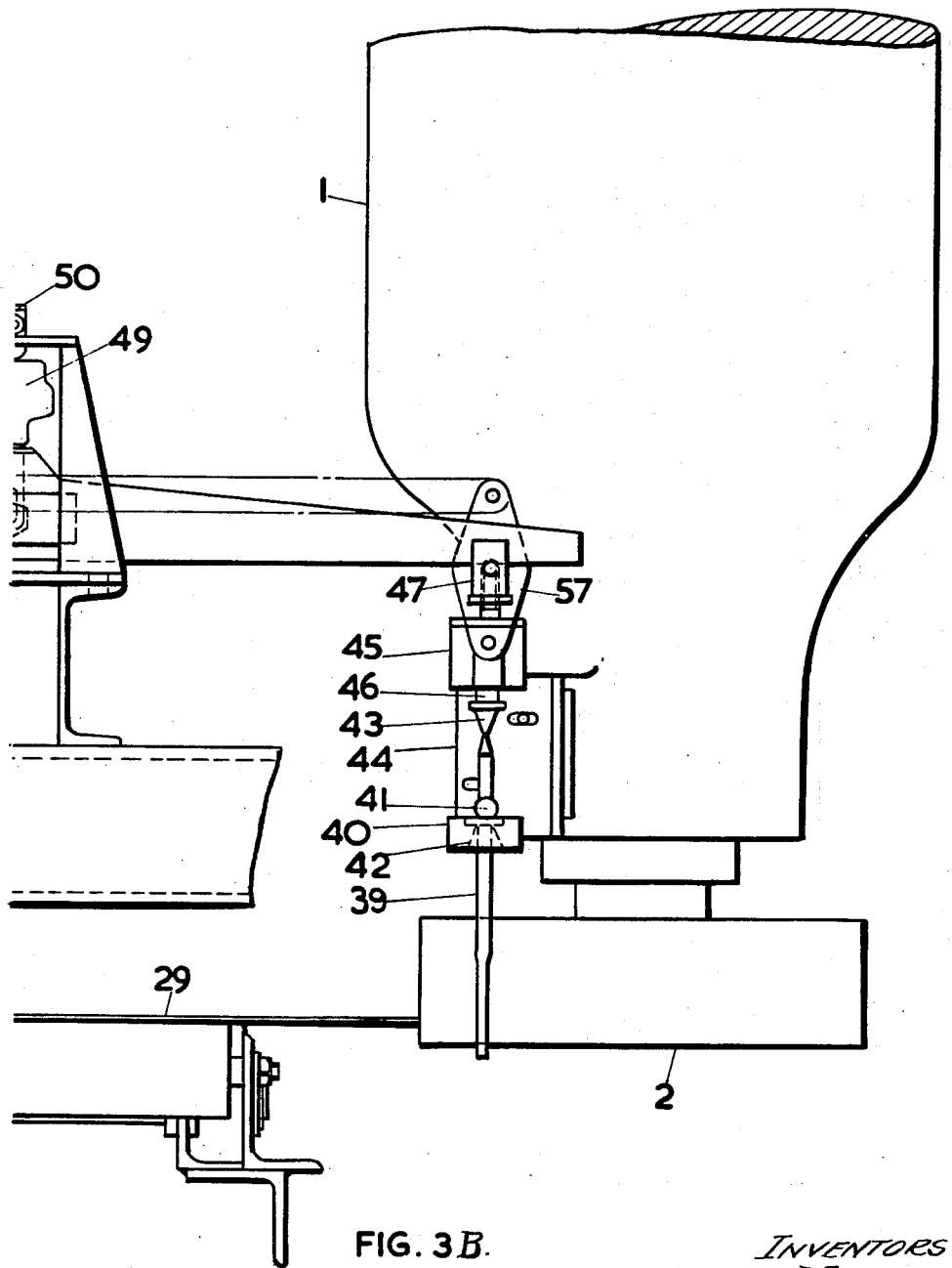

The first embodiment of the safety device, operated by the strip if it runs out of its correct position, is illustrated in FIGURE 3. A vertical striker 39 is supported a little in advance of the cutter 2 on a mounting 40 on a bracket 44 secured to the casing of the cutter head 1, and is so positioned as to extend below the pass line of the machine at a small distance from the edge of the strip. A striker is located at both edges of the strip.

The striker 39 is supported on the mounting 40 by a portion of increased diameter shaped as a ball 41 and extends through a tapered orifice 42 in the mounting 40. The upper end of the striker 39 is pointed and engages in a dimple at the end of a pointed detent 43 on a plunger 46 carried by a cup 45 secured to the bracket 44. The plunger 46 is spring-loaded in a downward direction. A fork 47 at the upper end of the plunger 46 supports a yoke 48, the center portion of which engages the operating member of a pneumatic valve 49.

Displacement of the striker 39 by the edge of the strip disengages the upper end from the detent 43 and the plunger 46 falls under the pressure of its spring. One end of the yoke 48 is no longer supported and drops whilst the other end is supported by the plunger of the other striker. The center portion of the yoke 48 is in consequence lowered and permits operation of the pneumatic valve 49 which is spring-biassed. A test lever 50 is provided which permits the valve 49 to be lifted and so tested without disturbing the yoke 48.

Pneumatic valve 49 controls operation of an air cylinder 51 which actuates a hydraulic valve 52 connected through pipes 53 and 54 with hydraulic cylinders 7. Equal pressures are maintained on both faces of the pistons in cylinders 7, but the thrust is greater on the outer face because of its greater surface area, in order to hold the auxiliary slides 3 against the nut members 5. Operation of the pneumatic valve 49 by displacement of the striker 39 if the strip runs out of line actuates the air cylinder 51 to operate the valve 52 so that pressure is released from the outer face of the pistons of cylinders 7 and the pressure on the inner faces of the pistons moves the pistons outwards and quickly moves the auxiliary slides 3 outwardly. The cutter heads 1 which are carried on the slides 3 are likewise moved and the cutters 2 are disengaged from the strip edges. The safety device may be reset by operating the lever 56 carrying links 57 loosely connected to the plunger 46 so that the plunger is raised and the upper end of the striker 39 is re-engaged with the detent 43.

Figure 4:
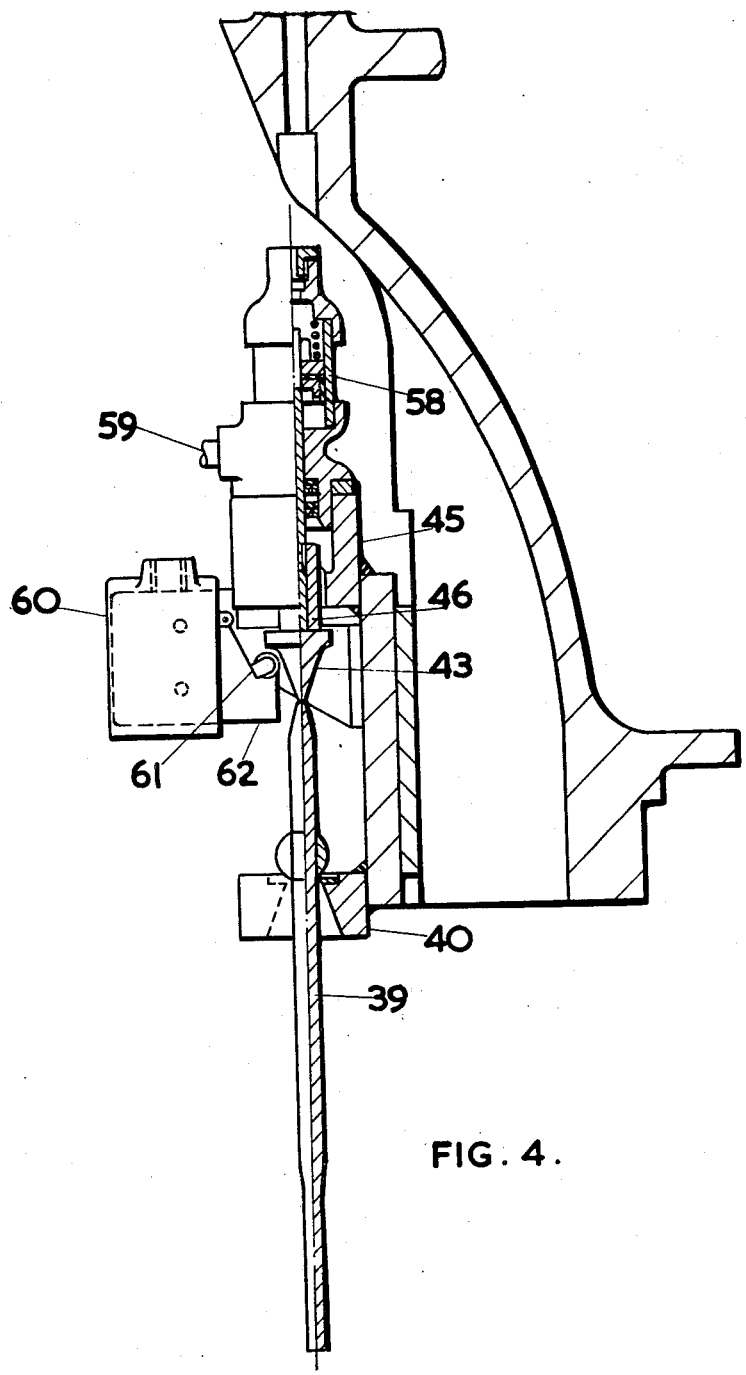
FIGURE 4 is an elevation partly in cross-section of the second embodiment of the safety device.

The second and preferred embodiment of the safety device is illustrated in FIGURE 4. The striker 39, mounting 40 and detent 43 are the same as described in connection with the first embodiment of the safety device and the plunger 46 slides in a cup 45 as previously described. Mounted at the upper end of the cup 45 is a pneumatic cylinder 58 connected to a source of air pressure by a pipe 59, the piston of cylinder 58 being attached to the plunger 46.

Alongside the detent 43 is mounted a microswitch 60 on a bracket 62, the operating lever 61 of which bears against the inclined surface of the detent 43. The microswitch 60 is connected to a solenoid (not shown) which controls operation of hydraulic valve 52.

A pair of strikers 39 are mounted one each side of the strip 29, each striker working independently of the other. When one of the strikers is displaced by contact with the edge of the strip, the detent 43 drops as before described and in so doing, its inclined surface deflects the operating lever 61 to close the contacts of the microswitch 60 and so energize the solenoid controlling the valve 52 which releases pressure from the outer faces of the cylinders 7 whereby the auxiliary slides 3 are moved outwardly as before described.

To reset the safety device the air cylinder 58 is operated to lift the detent 43 and re-engage its lower end with the upper end of the striker 39.

The hydraulic supply source, including pumps, accumulators and reservoir are not shown in the drawings for the sake of clarity.

Whilst the embodiment has been described with reference to hydraulic operation of the various sliding members it is to be understood mechanical, pneumatic, electrical or other suitable means may be used instead for imparting movement to the sliding members without departing from the scope of the invention.

Where the machine is intended for use with heavy gauge material, horizontal milling spindles may be employed instead of vertical millers.

We claim:

1. An edge trimming machine comprising a pair of drivable, rotary cutters mounted in spaced-apart relationship for cutting edges of a metal strip to be fed along a predetermined path between the cutters, the cutters being movable transversely with respect to the predetermined path, sensing means for cooperation with the edges of the strip on the ingoing side of the machine and coupled for transverse movement with the cutters, a guiding mechanism responsive to operation of the sensing means to effect transverse movement of the cutters, and a cutter withdrawal device for moving the cutters away from one another, said device comprising cutter locating means operably connected to the cutters to normally hold them in spaced-apart relationship for cutting edges of the metal strip, and a safety device for operation by the metal strip if it moves laterally of its predetermined path beyond a predetermined limit, the locating means being responsive to operation of the safety device to move the cutters away from one another to disengage them from the metal strip.

2. An edge trimming machine as claimed in claim 1 in which the rotary cutters comprise milling cutters on driven vertical spindles mounted on a cross slide permitting simultaneous transverse movement of the cutters.

3. An edge trimming machine as claimed in claim 2 including means for adjusting the distance apart of the cutters.

4. An edge trimming machine as claimed in claim 3 in which the means for adjusting the distance apart of the cutters comprises auxiliary slides supporting the driven vertical spindles, and a shaft having left- and right-hand threaded portions respectively engaging nut members associated with the auxiliary slides.

5. An edge trimming machine comprising a pair of driven rotary cutters mounted for cutting opposite edges of metal strip and movable transversely with respect to the strip, sensing means cooperable with the edges of the strip on the ingoing side of the machine and coupled for transverse movement with the cutters, a guiding mechanism responsive to operation of the cutting means to effect transverse movement of the cutters, and means for rapidly widening the distance between the cutters to effect quick disengagement of the cutters from the strip.

6. An edge trimming machine as claimed in claim 5 comprising auxiliary slides supporting the cutters, double-acting hydraulic cylinders for urging the slides into abutment with nut members engaging a left- and right-hand threaded adjustment shaft and means for varying the direction of thrust of the cylinders in response to the operation of a safety device.

7. An edge trimming machine as claimed in claim 1 in which the sensing means comprises a pair of pivoted feeler arms, freely rotatable guide rollers mounted on the ends of the feeler arms, and movable in the plane of the strip, and springs acting on the arms to urge the guide rollers into engagement with the edges of the strip.

8. An edge trimming machine comprising a pair of driven rotary cutters mounted for cutting opposite edges of metal strip and movable transversely with respect to the strip, sensing means cooperable with the edges of the strip on the ingoing side of the machine and coupled for transverse movement with the cutters, a guiding mechanism responsive to operation of the cutting means to effect transverse movement of the cutters, said sensing means being capable of longitudinal movement with respect to the strip when the guide rollers are a predetermined distance apart.

9. An edge trimming machine as claimed in claim 8 in which the sensing means is mounted on a carriage movable longitudinally by means of a hydraulic cylinder in response to valves actuated by the feeler arms.

10. An edge trimming machine as claimed in claim 9 in which the valves are actuated by cams rotated by the feeler arms.

11. An edge trimming machine comprising a pair of driven rotary cutters mounted for cutting opposite edges of metal strip and movable transversely with respect to the strip, sensing means cooperable with the edges of the strip on the ingoing side of the machine and coupled for transverse movement with the cutters, a guiding mechanism responsive to operation of the cutting means to effect transverse movement of the cutters, and a safety device operable to withdraw the cutters clear of the strip upon failure of the sensing means.

12. An edge trimming machine as claimed in claim 11 in which the safety device comprises a pair of vertical rods disposed one on each side of the strip a short distance in advance of the cutters, and servo-mechanism responsive to displacement of either of the rods to actuate hydraulic cylinders controlling auxiliary slides supporting the cutters.

13. An edge trimming machine as claimed in claim 12 including means operable by the safety device for stopping the feed of strip to the machine.

14. An edge trimming machine as claimed in claim 1 wherein the cutters are mounted upon supports which are movable relative to one another, and the cutter locating means comprises double-acting cutter locating hydraulic cylinders for urging the supports normally into abutment with nut members engaging a left and right threaded adjustment shaft to hold the cutters in spaced-apart relationship, the safety device upon operation causing change in the direction of thrust of the cylinders to move the cutters away from one another.

15. An edge trimming machine as claimed in claim 7 wherein the guiding mechanism comprises a cutter guiding hydraulic cylinder operably connected to the cutters to effect their transverse movement, and a hydraulic valve to actuate the cylinder, the hydraulic valve having a spool and a body, and wherein the feeler arms are operably connected one to the body and the other to the spool of the valve, relative movement of the arms effecting change in the relative positions of the spool and the body to control the supply of pressure to the hydraulic cylinder.

16. An edge trimming machine as claimed in claim 14 in which the safety device comprises a pair of vertical rods disposed one on each side of the predetermined path in advance of the cutters towards the ingoing side of the machine, and servo-mechanism responsive to displacement of either of the rods to actuate the cutter locating hydraulic cylinder to move the cutters away from one another.

17. An edge trimming machine comprising a pair of drivable rotary cutters mounted in spaced-apart relationship for cutting edges of a metal strip to be fed along a predetermined path between the cutters, the cutters being movable transversely with respect to the predetermined path, sensing means for cooperation with the edges of the strip on the ingoing side of the machine and coupled for transverse movement of the cutters, and a guiding mechanism responsive to operation of the sensing means to effect transverse movement of the cutters, the sensing means comprising a pair of pivoted feeler arms, freely rotatable guide rollers mounted on the ends of the feeler arms and movable in the plane of the strip, and springs acting on the arms to urge the guide rollers into engagement with the edges of the strip, the sensing means being movable relative to the cutter in the direction of the predetermined path when the guide rollers are a predetermined distance apart.

18. An edge trimming machine as claimed in claim 7 in which the sensing means is capable of longitudinal movement with respect to the strip when the guide rollers are a predetermined distance apart.

References Cited by the Examiner

UNITED STATES PATENTS

| | | | |
|---|---|---|---|
| 1,292,157 | 1/1919 | Townsend | 90—24.06 |
| 2,871,013 | 1/1959 | Markey | 271—2.6 |
| 2,911,044 | 11/1959 | Erskine | 83—368 |

FOREIGN PATENTS

| | | |
|---|---|---|
| 658,042 | 2/1963 | Canada. |
| 955,552 | 4/1964 | Great Britain. |

ANDREW R. JUHASZ, *Primary Examiner.*

WILLIAM W. DYER, JR., *Examiner.*

G. A. DOST, *Assistant Examiner.*